(12) United States Patent
Lai et al.

(10) Patent No.: US 7,372,981 B2
(45) Date of Patent: May 13, 2008

(54) STATISTICAL FACIAL FEATURE EXTRACTION METHOD

(75) Inventors: Shang-Hong Lai, Hsinchu (TW); Jiang-Ge Chen, Sinying (TW); Yea-Shuan Huang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 767 days.

(21) Appl. No.: 10/720,198

(22) Filed: Nov. 25, 2003

(65) Prior Publication Data

US 2004/0213454 A1    Oct. 28, 2004

(30) Foreign Application Priority Data

Apr. 28, 2003  (TW) ............................... 92109928 A

(51) Int. Cl.
    *G06K 9/00*       (2006.01)
(52) U.S. Cl. ..................................... 382/118
(58) Field of Classification Search .............. None
    See application file for complete search history.

(56) References Cited

U.S. PATENT DOCUMENTS 5,164,992 A * 11/1992 Turk et al. .................. 382/118

OTHER PUBLICATIONS

A. Lanitis et. al., *Automatic face identification system using flexible appearance models*, Image and Vision Computing, vol. 13, No. 5, Jun. 1995, pp. 393-401.
T. F. Cootes et. al., *Active Shape Models—Their Training and Application*, Computer Vision And Image Understanding, vol. 61, No. 1, Jan. 1995, pp. 38-59, England.
Ming-Huan Yang et. al., *Detecting Faces in Images: A Survey*, IEEE Transactions On Pattern Analysis And Machien Intelligence, vol. 24, No. 1, Jan. 2002, pp. 34-58.

* cited by examiner

*Primary Examiner*—Matthew C. Bella
*Assistant Examiner*—Alex Liew
(74) *Attorney, Agent, or Firm*—Bacon & Thomas, PLLC

(57) ABSTRACT

A statistical facial feature extraction method is disclosed. In a training phase, N training face images are respectively labeled n feature points located in n different blocks to form N feature vectors. Next, a principal component analysis (PCA) technique is used to obtain a statistical face shape model after aligning each shape vector with a reference shape vector. In an executing phase, initial positions for desired facial features are firstly guessed according to the coordinates of the mean shape for aligned training face images obtained in the training phase, and k candidates are respectively labeled in n search ranges corresponding to above-mentioned initial positions to obtain $k^n$ different combinations of test shape vectors. Finally, coordinates of the test shape vector having the best similarity with the mean shape for aligned training face image and the statistical face shape model are assigned as facial features of the test face image.

15 Claims, 10 Drawing Sheets

The Training Phase (S101) Selecting N training face images (S102) Labeling feature points to define corresponding shape vectors (S103) Aligning each shape vector with a reference shape vector (S104) Using a principal component analysis process to create a statistical face shape model The Executing Phase (S105) Selecting a test face image (S106) Guessing initial positions of n test feature points located in the test image (S107) Defining n search ranges in the test face image (S108) Labeling k candidate feature points for each search range (S109) Combining candidate feature points in different search ranges in order to form $k^n$ test shape vectors (S110) Computing the similarity of each test shape vector (S111) Assigning one feature point corresponding to one, having the best similarity, of the test shape vectors as facial features of the test face image

STATISTICAL FACIAL FEATURE EXTRACTION METHOD

BACKGROUND OF THE INVENTION

1. Field of the Invention

The present invention relates to a statistical facial feature extraction method, which uses principle component analysis (PCA) to extract facial features from images.

2. Description of Related Art

With the development of information technology continuously, more and more corresponding applications are introduced into our daily lives for improvement. Especially, the use of effective human-computer interactions makes our lives more convenient and efficient. With recent dramatic decrease in video and image acquisition cost, computer vision systems can be extensively deployed in desktop and embedded systems. For example, an ATM machine can identify users by the images captured from the camera equipped on it, or the video-based access control systems can give the access permission by recognizing captured face images.

Among all the interfaces between humans and computers, a human face is commonly regarded as one of the most efficient media since it carries enormous information (i.e., many facial features like eyes, nose, nostrils, eyebrow, mouth, lip, . . . , etc.), and is most visually discriminative among individuals. Therefore, facial images of individuals can be recognized easier than other kinds of images.

Two typical techniques for facial feature extraction are used: one parameterized model method for describing the facial features based on the energy-minimized values, and the other eigen-image method for detecting facial features.

The former method uses deformable templates to extract desired facial features to change the properties such as size and shape, to match the model to the image and thus obtain more precise description to the facial features. The execution phase uses peak, valley, and edge images as representatives to highlight the salient feature in an image data, and an energy minimization function to alter deformable templates in the image data. The deformable templates are parameterized models for describing the facial features, such as eyes or mouth. Parameter settings can alter the position, orientation, size and other properties of the templates. In addition, an automatic feature detection and age classification system for human face images have developed in the prior art. They represent the shape of eyes or face contour by parametric curves (for example, combination of parabola curves or ovals). Next, an energy function is defined for each facial feature based on its intensity property. For example, a valley can describe the possible location of an iris.

However, the cited method is based on finding the best deformable model capable of minimizing an energy function having the property of the particular facial feature of interest, so deformable model used by the minimization process usually needs a proper initial guess value to help for computing required convergence.

In the other eigen-image method for detecting facial features, a face recognition system is applied to localize desired head and eyes from images in the basis of principal component analysis (PCA) algorithm. For the detection of eyes, typical eigen-eye images are constructed from the basis of eye feature images. To speed up the computational cost, the correlation between an input image and the eigen-template image is computed by Fast Fourier Transform (FFT) algorithm. However, the cited method uses a separate template for comparison, which can only find an individual difference. For example, using a left eye feature image can extract only the corresponding left eye location from a facial image, but cannot detect complete features of a whole face image and is not easy to be matched to statistical models.

Therefore, it is desirable to provide an improved facial feature extraction method to mitigate and/or obviate the aforementioned problems.

SUMMARY OF THE INVENTION

An object of the present invention is to provide a statistical facial feature extraction method, which is based on principal component analysis (PCA) technique to further accurately describe the appearance and geometric variations of facial features.

Another object of the present invention is to provide a statistical facial feature extraction method, which can combine the statistical information on geometric feature distribution and photometric feature appearance obtained in a facial feature training phase, thereby extracting complete facial features from face images.

A further object of the present invention is to provide a statistical facial feature extraction method, which does not need a proper initial guess value because only candidate feature positions (shapes) are required to be found in candidate search ranges of each facial feature, as based on face images completely detected by a face detection method, thereby reducing system load.

To achieve the object, the statistical facial feature extraction method of the present invention comprises a first procedure and a second procedure. The first procedure creates a statistical face shape model based on a plurality of training face images. This is achieved by selecting N training face images and respectively labeling feature points located in n different blocks for the training face images to define corresponding shape vectors of the training face images; aligning each shape vector with a reference shape vector after the shapes for all the face images in the training data set are labeled; and using a principal component analysis (PCA) process to compute a plurality of principal components based on the aligned shape vectors and thus forming the statistical face shape model, wherein the shape vectors are represented by a statistical face shape with conjunction to a plurality of projection coefficients.

The second procedure extracts a plurality of facial features from a test face image. This is achieved by selecting a test face image; guessing n initial positions of n test feature points, wherein the initial positions are located in the test face image and each initial position is represented by a mean value of the n feature points of the aligned shape vectors; defining n search ranges in the test face image, based on the initial positions, wherein the search ranges correspond to different blocks, respectively; labeling a plurality of candidate feature points for each search range; doing combination of the candidate feature points in different search ranges to form a plurality of test shape vectors; and matching each shape vector to the mean value and principle components in order to compute a similarity, wherein one, having the best similarity, of the test shape vectors, corresponds to candidate feature points to be assigned as facial features of the test face image.

Other objects, advantages, and novel features of the invention will become more apparent from the following detailed description when taken in conjunction with the accompanying drawings.

DETAILED DESCRIPTION OF THE PREFERRED EMBODIMENT

Two embodiments are given in the following for purpose of better understanding.

The statistical facial feature extraction method of the present invention essentially includes two phases: a training phase for creating a statistical face shape model based on a plurality of training face images; and a executing phase for extracting a plurality of facial features from a test face image. In this embodiment, each face image can be defined by six feature points located in different ranges, including four points at the internal and external corners of eyes and two points at the corners of mouth. Of course, other features such as nostrils, eyebrow and/or the like can be defined. These features may vary with different face poses, lighting conditions or facial expressions. Therefore, a template matching algorithm is used to find candidates of facial features. Required templates for facial features are constructed from a lot of training examples in the training phase. In addition, a principal component analysis (PCA) technique is applied to gain further precise description on appearance and geometry variations of facial features.

Figure 1:
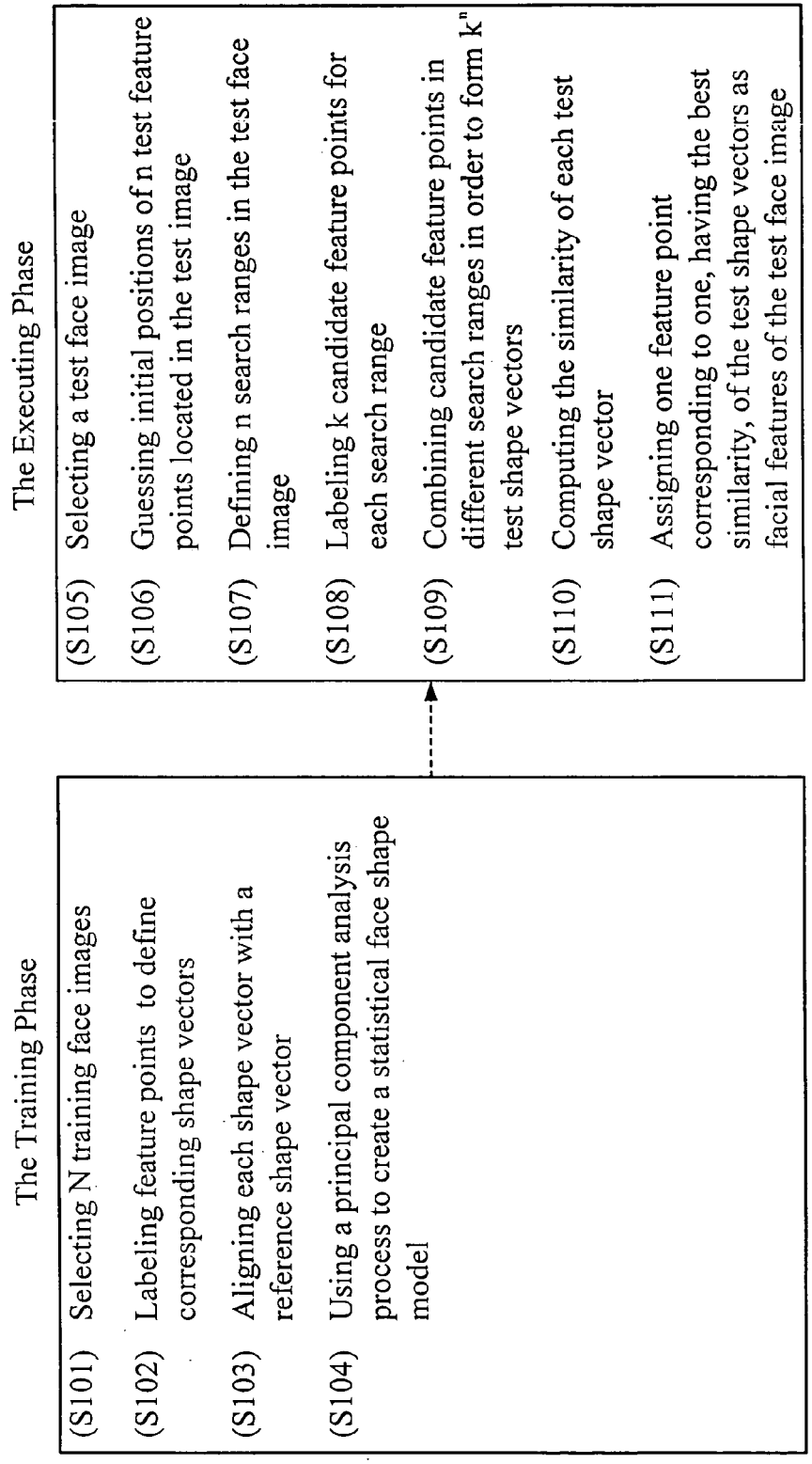
FIG. 1 is a flowchart of an embodiment of the present invention.
Figure 2:
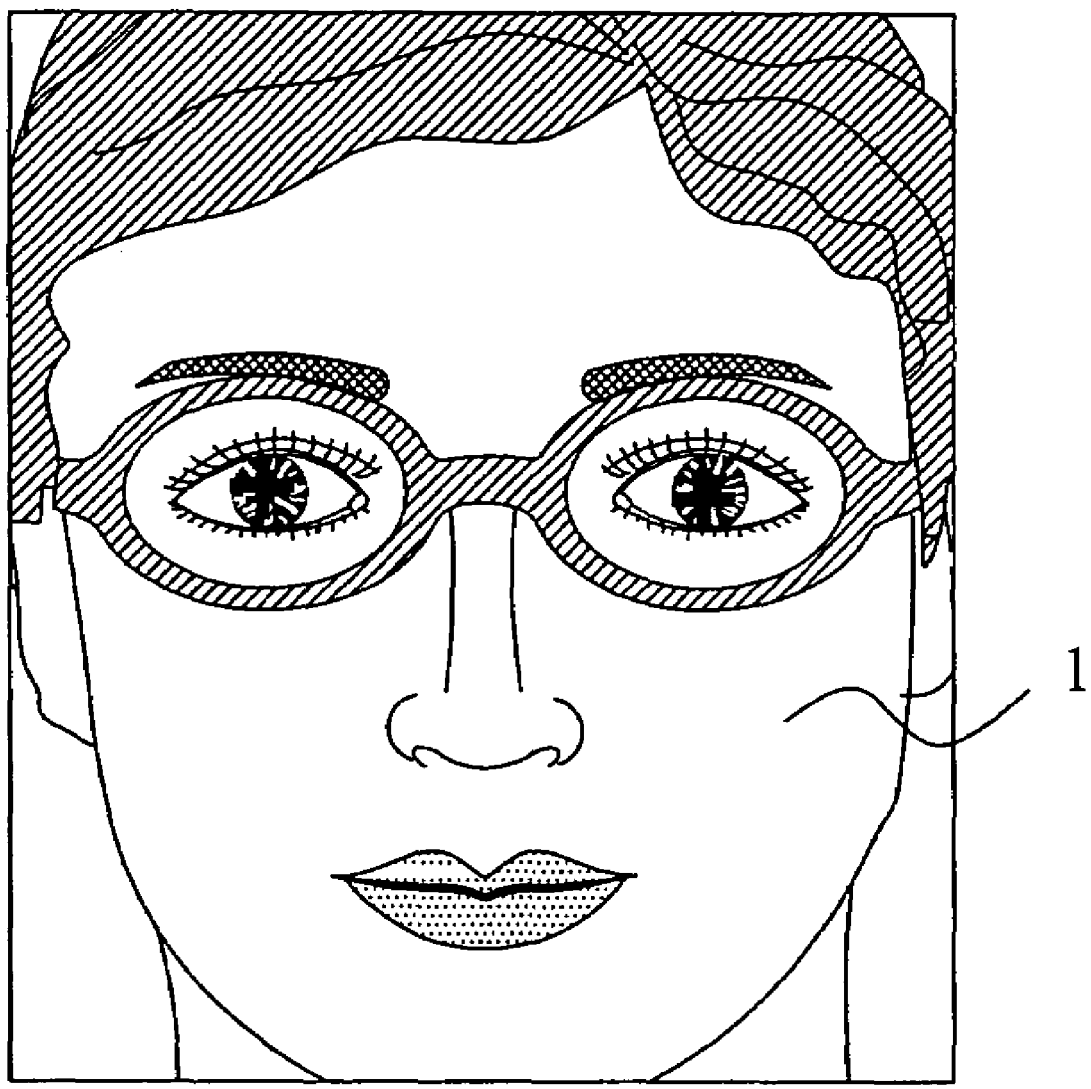
FIG. 2 is a schematic diagram of training face images according to the embodiment of the present invention.
Figure 3:
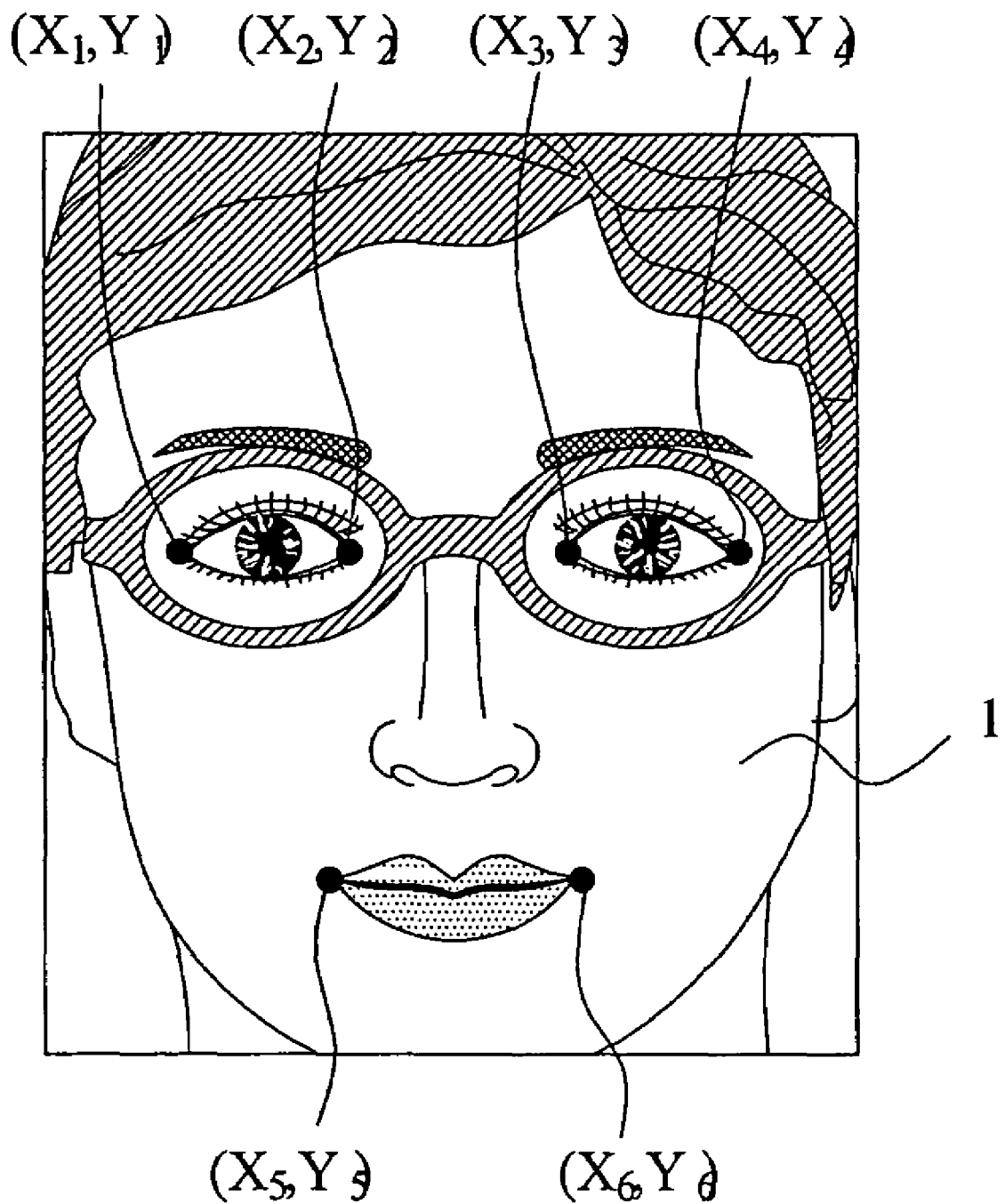
FIG. 3 is a schematic diagram of labeled feature points of FIG. 2 according to the embodiment of the present invention.

The Training Phase:

With reference to the flowchart of FIG. 1, the primary purpose in the training phase is to create a statistical face shape model and local facial feature templates based on a plurality of training face images. Accordingly, N such as 100 or 1000 of training face images 1 shown in FIG. 2 are selected as training samples (step S101), preferably selecting frontal face images and using N as big as possible for creating more accurate model and templates. However, the number of training samples to be required depends on practical need. Next, the six feature points for each training face image 1 are manually labeled (step S102) or automatically labeled by any known image extraction technique. As shown in FIG. 3, these feature points labeled on the training face image include coordinates $(x_1,y_1)$, $(x_2,y_2)$, $(x_3,y_3)$ and $(x_4,y_4)$ of the internal and external corners of eyes, and coordinates $(x_5,y_5)$ and $(x_6,y_6)$ of the corners of mouth. Accordingly, a shape vector $x_j=(x_{j1}, y_{j1}, \ldots, x_{jn}, y_{jn})$ is defined, where in this embodiment, n=6, and $x_{j1}$ equals to $x_1$ shown in FIG. 3, $y_{j1}$ equal to $y_1$, and so on.

To reduce difference between training face images 1 due to face pose and expression variations, a 2D scaled rigid transform algorithm is applied to align each shape vector $x_j$ with a reference shape vector $x_i=(x_{i1},y_{i1}, \ldots, x_{in},y_{in})$ by means of scaling, 2D rotation and shift. The vector $x_i$ can be one of the cited N shape vector $x_j$ or a self-defined vector corresponding to the cited feature point coordinates.

Figure 4:
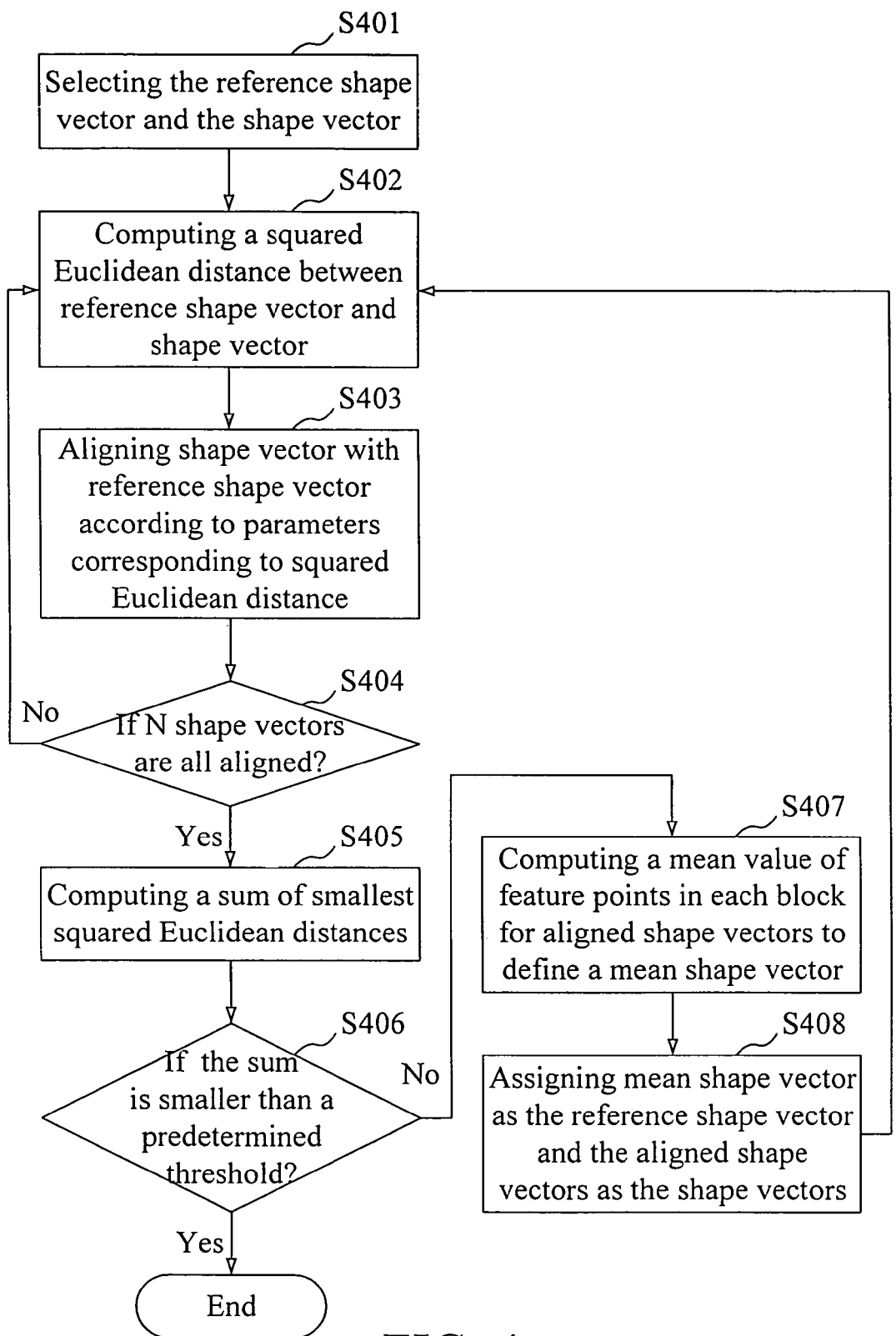
FIG. 4 is a flowchart illustrating a process of aligning a shape vector with a reference shape vector according to the embodiment of the present invention.

With reference to FIG. 4, there is shown a flowchart of aligning a shape vector $x_j$ with a reference shape vector $x_i$ in this embodiment. After the reference shape vector $x_i$ and the shape vector $x_j$ are selected (step S401), a squared Euclidean distance E between the vectors $x_i$ and $x_j$ is computed (step S402) based on the following equation:

$$E=(x_i-M^{(N)}(\alpha,\theta)[x_j]-t)^T(x_i-M^{(N)}(\alpha,\theta)[x_j]-t) \quad \text{(step S402)},$$

where $M^{(N)}(\alpha,\theta)[x_j]-t$ is a geometric transformation defining with a plurality of transfer parameters to align the shape vector $x_j$. The transfer parameters include a rotating angle $\theta$, a scaling factor $\alpha$, and a shifting vector represented by $t=(t_x,t_y)$. In addition, as $$M(\alpha,\theta) = \begin{pmatrix} \alpha\cos\theta & -\alpha\sin\theta \\ \alpha\sin\theta & \alpha\cos\theta \end{pmatrix},$$

$M^{(N)}(\alpha,\theta)$ is a 2n×2n diagonal blocked matrix, where each diagonal block is a 2×2 matrix $M(\alpha,\theta)$, and $$M(\alpha,\theta)\begin{bmatrix} x_{jk} \\ y_{jk} \end{bmatrix} = \begin{pmatrix} \alpha\cos\theta x_{jk} - \alpha\sin\theta y_{jk} \\ \alpha\sin\theta x_{jk} + \alpha\cos\theta y_{jk} \end{pmatrix},$$

where $1 \leq k \leq n$. Next, E is minimized as the equation:

$$E=(x_i-M^{(N)}(\alpha_j,\theta_j)[x_j]-t_j)^T(x_i-M^{(N)}(\alpha_j,\theta_j)[x_j]-t_j),$$

such that the parameters of angle $\theta_j$, factor $\alpha_j$, and vector represented by $t_j=(t_{xj},t_{yj})$ are found and used to align the shape vector (step S403).

After the N shape vectors $x_j$ in this embodiment are all aligned with the reference shape vectors $x_i$ (step S404), a least square algorithm is used to minimize the sum of squared Euclidean distance between the vectors $x_j$ and $x_i$ (step S405). The least square algorithm for the above minimization leads to solving the following linear system:

$$\begin{pmatrix} Z & 0 & X2 & Y2 \\ 0 & Z & -Y2 & X2 \\ X2 & -Y2 & n & 0 \\ Y2 & X2 & 0 & n \end{pmatrix} \begin{pmatrix} a \\ b \\ t_{xj} \\ t_{yj} \end{pmatrix} = \begin{pmatrix} C1 \\ C2 \\ X1 \\ Y1 \end{pmatrix},$$

where n is the number of landmark points of each shape and, $$X1 = \sum_{k=1}^{n} x_{ik}, Y1 = \sum_{k=1}^{n} y_{ik}, X2 = \sum_{k=1}^{n} x_{jk}, Y2 = \sum_{k=1}^{n} y_{jk},$$

$$Z = \sum_{k=1}^{n} x_{jk}^2 + y_{jk}^2, C1 = \sum_{k=1}^{n} x_{ik} x_{jk} + y_{ik} y_{jk}, \text{ and}$$

$$C1 = \sum_{k=1}^{n} y_{ik} x_{jk} + x_{ik} y_{jk}.$$

Therefore, the transformation parameters are obtained by solving the above linear system. If the above computation results in a value smaller than a predetermined threshold (step S406), the aligning step is finished, otherwise, a mean value of feature points of aligned shape vectors for each block is computed to define a mean shape vector as $$\bar{x} = \frac{1}{N} \sum_{a=1}^{N} x_a$$

(step S407), where $x_a$ is aligned shape vector. After the mean shape vector $\bar{x}$ is assigned as the reference shape vector $x_i$, and all aligned shape vectors $x_a$ are assigned as the shape vectors $x_j$ (step S408), go to step S402 until the process converges.

It is noted that the reference shape vector $x_i$ assigned when the aligning step is performed at first time preferably corresponds to a non-inclined face image for reducing system load and operation process. However, inclined face images are also available because a mean shape vector is regarded as the reference shape vector since the aligning step is performed at second time (equivalent to steps S402-S408 of FIG. 4). Namely, the mean shape vector is regarded as the reference shape vector for gradually aligning the difference among the shape vectors $x_j$ to convergence. Briefly, major function of performing the aligning step at first time is that all scaling shape vectors $x_j$ are aligned to be alike to each other, thereby gradually modifying results at sequential aligning steps on performance until the process converges.

After all shape vectors $x_j$ are aligned with the reference shape vectors $x_i$ assigned, a principal component analysis (PCA) technique is used to compute a plurality of principal components and further form a statistical face shape model (step S104) according to aligned shape vectors $x_a$, wherein the statistical face shape model is a point distribution model (PDM) and represents the shape vectors $x_j$, with conjunction to a plurality of projection coefficients.

Figure 5:
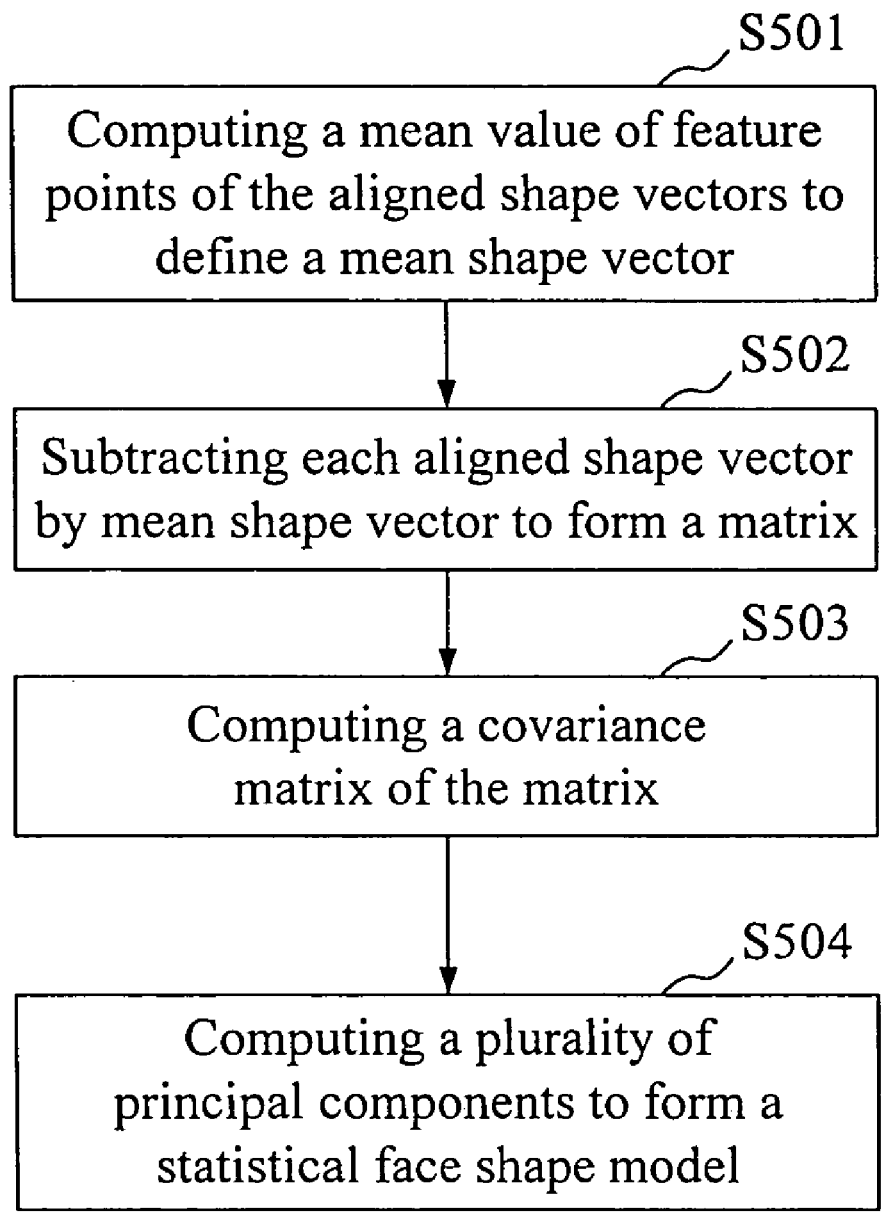
FIG. 5 is a flowchart illustrating a process of calculating a statistical facial shape model according to the embodiment of the present invention.

For a step of computing the statistical face shape model, refer to the flowchart of FIG. 5. As shown in FIG. 5, a mean value of feature points of aligned shape vectors is computed to define a mean shape vector as $$\bar{x} = \frac{1}{N} \sum_{a=1}^{N} x_a$$

(step S501). Next, the result $d_{x_a} = x_a - \bar{x}$ obtained by subtracting the mean shape vector $\bar{x}$ from each aligned shape vector $x_a$ forms a matrix $A = [d_{x_1}, d_{x_2}, \ldots, d_{x_N}]$ (step S502). Next, the covariance matrix C of matrix A is computed to find the equation $C = AA^T$ (step S503). Next, the plurality of principal components are computed according to eigenvectors derived from the equation $Cv_k^s = \lambda_k^s v_k^s$ with eigenvalues corresponding to the covariance matrix C, to form the statistical face shape model (step S504), wherein $\lambda_k^s$ represents eigenvalues of the covariance matrix C, $v_k^s$ represents eigenvectors of the covariance matrix C, and $1 \leq k \leq m$, where m is the dimension of the covariance matrix C for $\lambda_1^s \geq \lambda_2^s \geq \ldots \geq \lambda_m^s$.

Further, in this embodiment, each shape vector $x_j$ consists of six (i.e. n=6) feature vectors $s_j$ located in different blocks, so an average value, evaluated by the equation $$t = \frac{1}{N} \sum_{j=1}^{N} s_j,$$

of feature vectors $s_j$ corresponding to special blocks of all shape vector $x_j$ is defined as a feature template.

When the cited steps in the training phase are performed, the statistical face shape model and the feature templates are created for facial feature extraction in a following executing phase.

Figure 6:
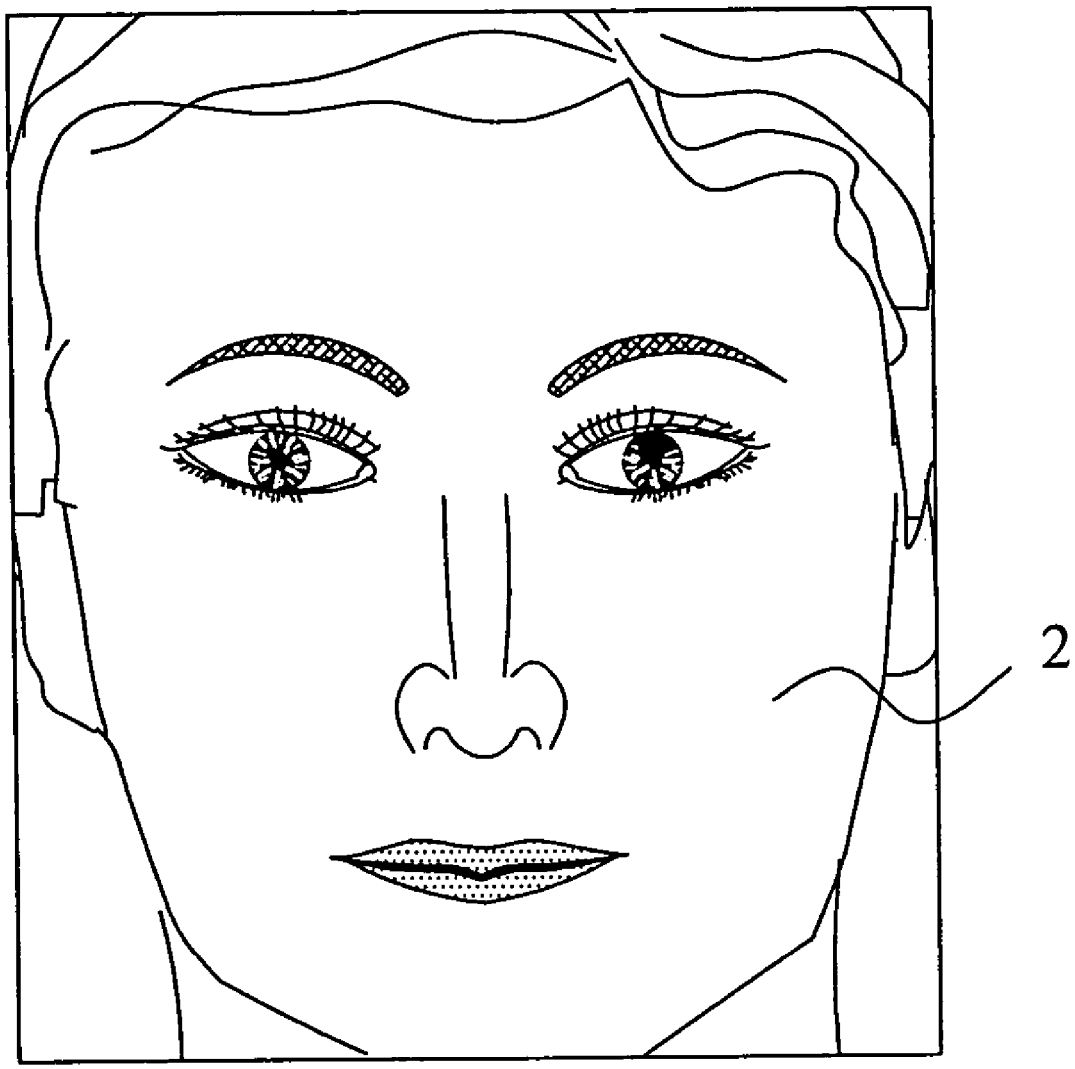
FIG. 6 is a schematic diagram of a test face image according to the embodiment of the present invention.
Figure 7:
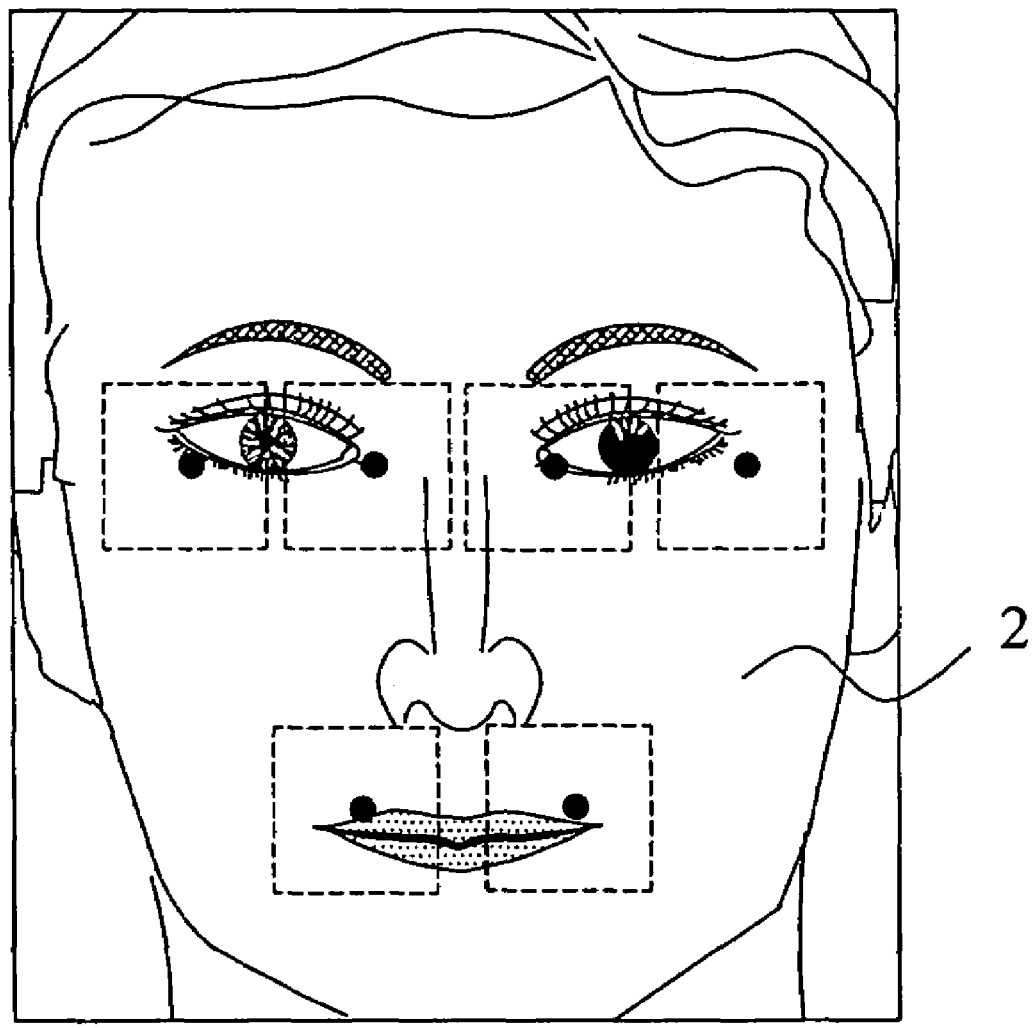
FIG. 7 is a schematic diagram of search ranges defined by initial positions of test feature points according to the embodiment of the present invention.

The Executing Phase (Feature Extracting Phase):

Refer to the flowchart of FIG. 1 and a schematic diagram of test face image 2 of FIG. 6. After the test face image 2 is selected (step S105), the mean shape vectors $\bar{x}$ obtained in the training phase are regarded as initial positions of test feature points of the test face image 2 (step S106). It is noted that scaling of an initial test shape formed by the test feature points is preferably aligned similarly to the test face image 2. Based on each initial position, six search ranges are respectively defined in the test face image 2 (step S107), wherein the sizes of search ranges can vary with different test face images 2. Refer to FIG. 7, in which search ranges respectively corresponding to a different block (i.e., one of corners of eyes and mouth) are shown. That is, assume that actual feature points of the test face image 2 are respectively located in the search ranges.

Figure 8:
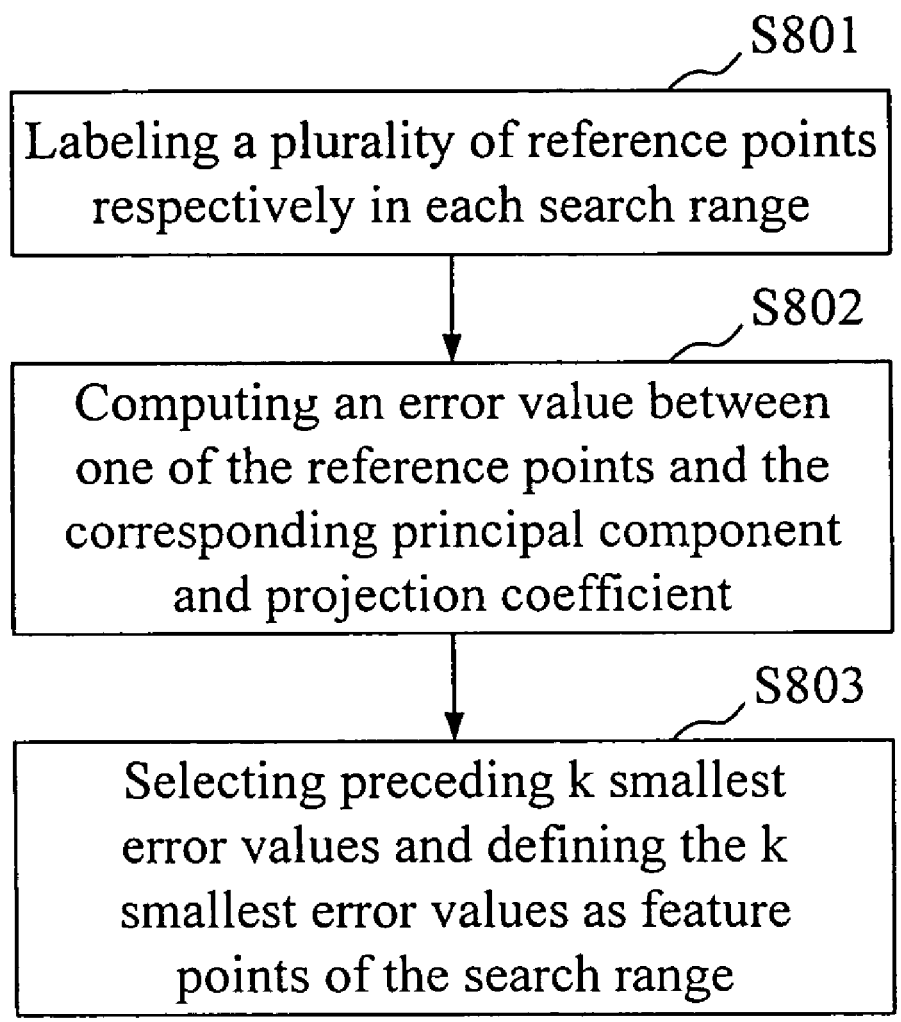
FIG. 8 is a flowchart illustrating a process labeling candidate feature points according to the embodiment of the present invention.

An actual feature point of the test face image 2 may be located in the search ranges at any coordinate value. Therefore, a more precise candidate feature point is defined in the search ranges (step S108). With integrable reference to the flowchart of FIG. 8, a plurality of reference points derived by $$I_i \cong t + \sum_{j=1}^{k} b_j p_j,$$

are respectively labeled in each search range (step S801), where t is the feature template of block corresponding to a search range, $p_j$ is j-th principal component of the statistical face shape model computed from the training feature vectors, and $b_j$ is associated projection coefficient. Next, an error value between a reference point and the corresponding principal component $p_j$ and projection coefficient $b_j$ is computed as $$\varepsilon = \left\| I_i - t - \sum_{j=1}^{k} b_j p_j \right\|_2 \quad \text{(step S802).}$$

Finally, k smallest error values are selected to define as candidate feature points of the search range (step S803).

Therefore, all combinations for candidate feature points located in different ranges are done to form k$^n$ test shape vectors (step S109). In this embodiment, n represents the number of feature points, for example, in this case, n=6. If two of the six feature points have smaller error values and are extracted, 2$^6$(=64) different combinations of test shape vectors are obtained. All test shape vectors are respectively matched with the mean value of aligned shape vector x$_a$ and the principal component of statistical face shape model to compute a similarity (step S110). As a result, one candidate feature point corresponding to the test shape vector with the best similarity is assigned as facial feature of the test face image 2 (step S111).

Figure 9:
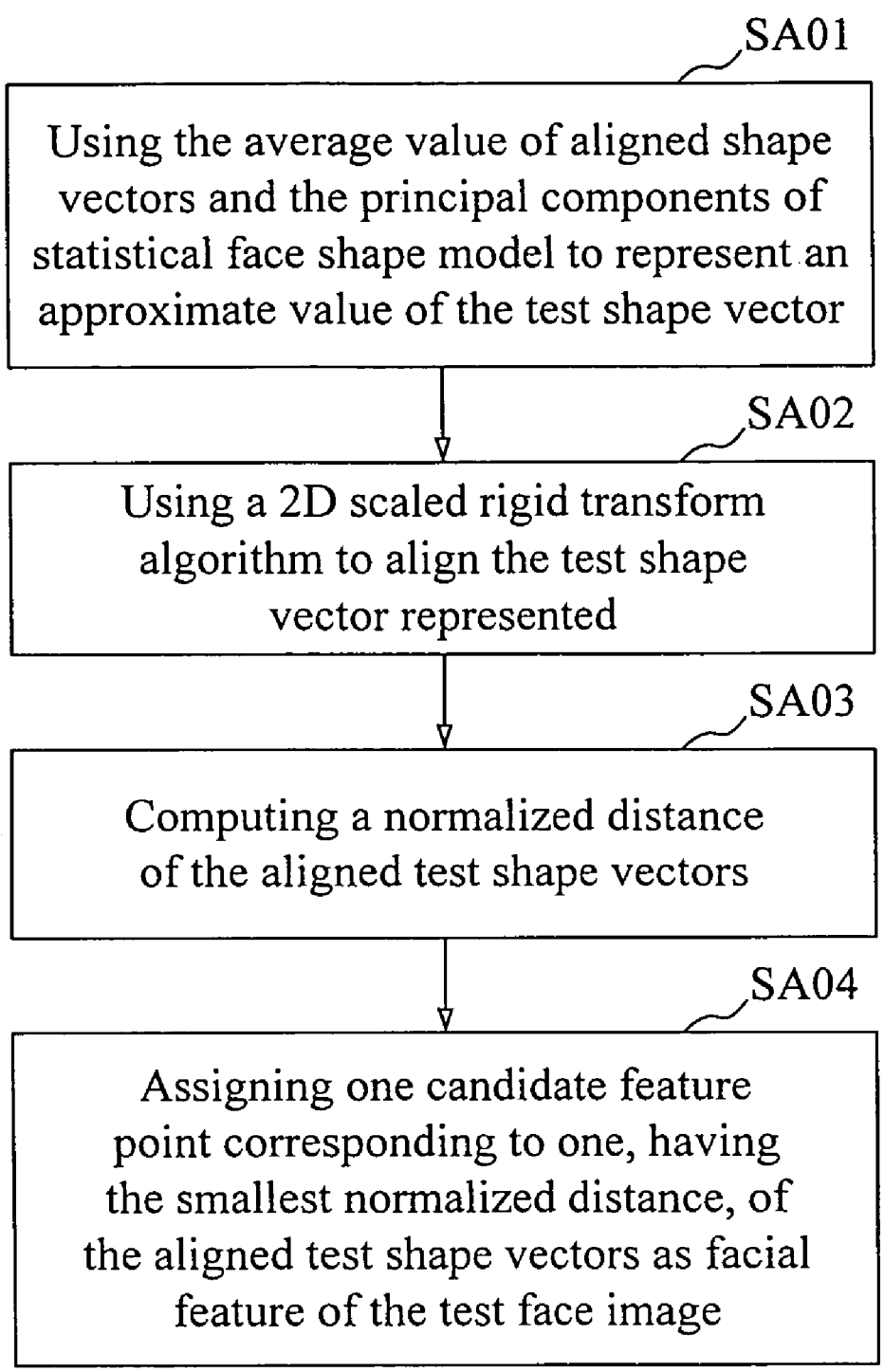
FIG. 9 is a flowchart of decision steps according to the embodiment of the present invention.

This embodiment is based on the decision flowchart of FIG. 9 to find facial features of the test face image 2. After an approximate value of test shape vector is represented as $$x \cong \bar{x} + \sum_{j=1}^{k} b_j^x p_j^x$$

by a mean shape vector $\bar{x}$ and the principal components of the statistical face shape model (step SA01), a 2D scaled rigid transform algorithm aligns test shape vector using the equation $$x \cong M(\alpha, \theta)\left[\bar{x} + \sum_{j=1}^{k} b_j^x p_j^x\right] + t \text{ (step } SA02\text{)},$$

where θ, α and t are a rotating angle, a scaling factor and a shifting vector respectively. Next, a normalized distance for aligned test shape vectors aligned at step SA02 is computed by $$d(x) = \sqrt{\sum_{j=1}^{k} \left(\frac{b_j^x}{\lambda_j^x}\right)^2}$$

(step SA03). The normalized distance d(x) is considered as the criterion to determine which combination of candidate feature points is the most similar to a face shape. Therefore, one candidate feature point corresponding to one, having the smallest normalized distance, of the aligned test shape vectors is assigned as facial feature of the test face image (step SA04).

Figure 10:
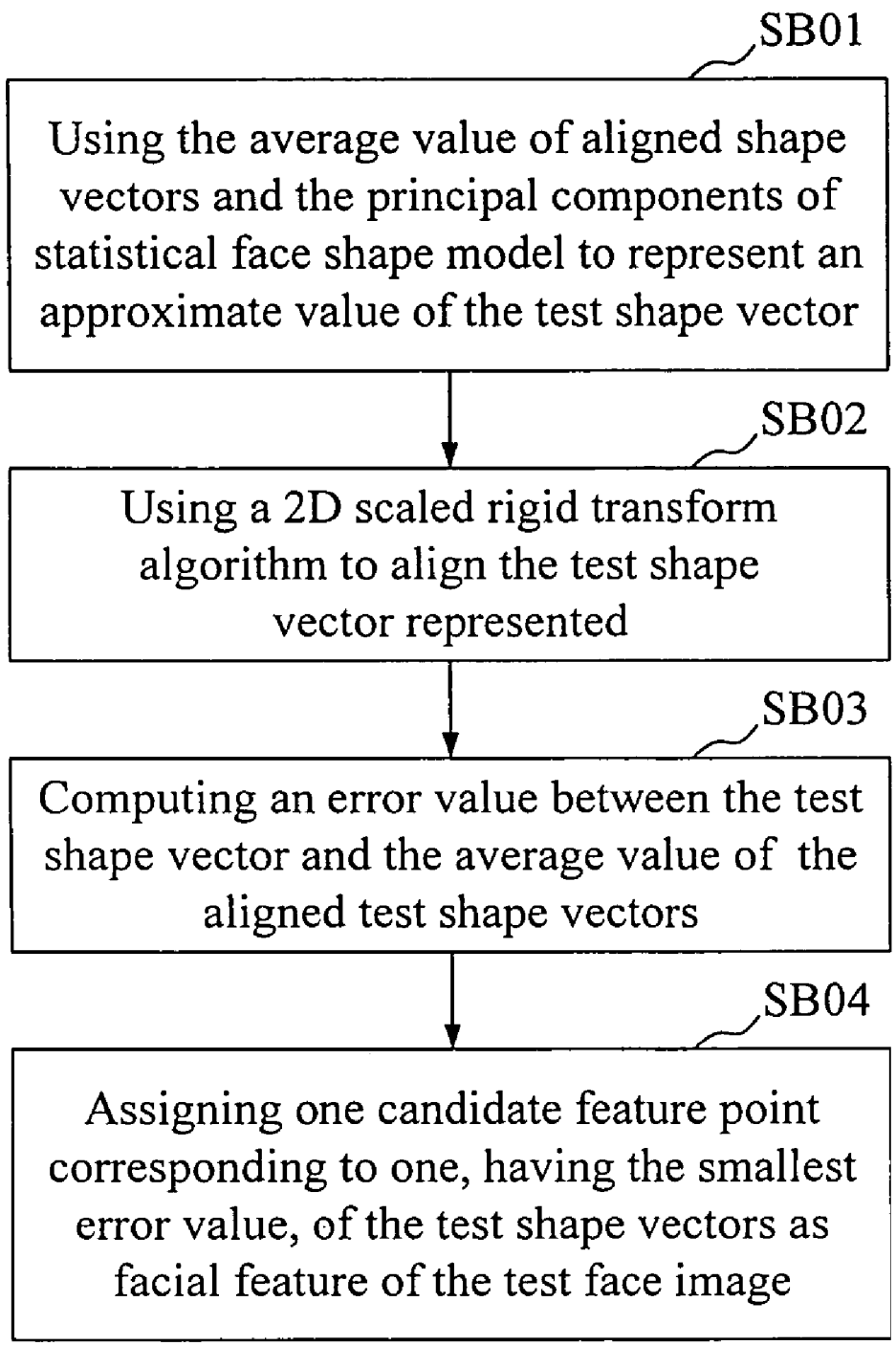
FIG. 10 is a flowchart of decision steps according to another embodiment of the present invention.

In addition, the invention also provides another embodiment of decision flow to find facial features of the test face image 2. With reference to FIG. 10, steps SB01 and SB02 are the same as steps SA01 and SA02 of FIG. 9, but step SB03 in this embodiment computes an error value between a test shape vector and corresponding mean shape vector $\bar{x}$ as follows.

$$\varepsilon(x) = w_1 \sum_{i=1}^{6} \left\| I_i(x) - t_i - \sum_{j=1}^{k} b_j^i p_j^i \right\|_2 + w_2 d(x),$$

where $$\sum_{i=1}^{6} \left\| I_i(x) - t_i - \sum_{j=1}^{k} b_j^i p_j^i \right\|_2$$

is a similarity of the test shape vector to corresponding aligned shape vector x$_a$, and d(x) is the normalized distance of x$_a$. The cited error value equation can be also rewritten as $$\varepsilon(x) = w_1 \left(\sum_{i=1}^{n} \sqrt{\sum_{j=1}^{k} \left(\frac{b_j^i}{\lambda_j^i}\right)^2}\right) + w_2 d(x),$$

based on the error value equation used by step S802. Finally, one candidate feature point corresponding to one, having the shortest error value, of the test shape vectors is assigned as facial feature of the test face image (step SB04??).

As cited above, the invention applies the principal component analysis (PCA) technique to more precisely describe appearance and geometric variances of facial features and further extracts entire facial features by combining statistical data of geometric and photometric properties on appearance obtained in the training phase. Thus, the problem that only extracts facial feature of a single portion in the prior art is improved. In addition, the invention does not need a proper initial guess value because only candidate feature positions (shapes) are required to be found in candidate search ranges of each facial feature, as based on face images completely detected by a face detection algorithm, thereby reducing system load.

Although the present invention has been explained in relation to its preferred embodiment, it is to be understood that many other possible modifications and variations can be made without departing from the spirit and scope of the invention as hereinafter claimed.

What is claimed is:

1. A statistical facial feature extraction method, comprising:
    a first procedure for creating a statistical face shape model based on a plurality of training face images, including:
    an image selecting step, to select N training face images;
    a feature labeling step, to respectively label feature points located in n different blocks of the training face images to define corresponding shape vectors of the training face images;
    an aligning step, to align each shape vector with a reference shape vector to thus obtain aligned shape vectors; and
    a statistical face shape model computing step, to use a principal component analysis (PCA) process to compute a plurality of principal components based on the aligned shape vectors to create a statistical face shape model, wherein the statistical face shape model represents the shape vectors by combining a plurality of projection coefficients, and the statistical face shape model computing step includes: computing a mean value of the feature points of the aligned shape vectors to define a mean shape vector $\bar{x}$ as $$\bar{x} = \frac{1}{N}\sum_{a=1}^{N} x_a$$

where $x_a$ is an aligned shape vector, subtracting each aligned shape vector $x_a$ by the mean shape vector $\bar{x}$ to form a matrix $A=[d_{x1},d_{x2},\ldots,d_{xN}]$ and $d_{x_a}=x_a-\bar{x}$, computing a covariance matrix C of the matrix A, and computing a plurality of principal components according to eigenvectors $v_k^s$, which are derived from $Cv_k^s=\lambda_k^s v_k^s$ with eigenvalues $\lambda_k^s$ corresponding to the covariance matrix C formed as $C=AA^T$ for $1 \leq k \leq m$ where m is the dimension of the covariance matrix C for $\lambda_1^s \geq \lambda_2^s \geq \ldots \geq \lambda_m^s$, to thereby form the statistical face shape model; and a second procedure for extracting a plurality of facial features from a test face image, including:

an initial guessing step, to guess initial positions of n test feature points located in the test face image, wherein the initial position of each test feature point is a mean value of the feature points of the aligned shape vectors;

a search range defining step, to define n search ranges in the test face image, based on the initial position of each test feature point, wherein each search range corresponds to a different block;

a candidate feature point labeling step, to label a plurality of candidate feature points for each search range;

a test shape vector forming step, to do combination of the candidate feature points in different search ranges in order to form a plurality of test shape vectors; and a determining step, to match the test shape vectors respectively to both the mean value and the principal components for computing a similarity, and to accordingly assign one feature point corresponding to one, having the best similarity, of the test shape vectors as facial features of the test face image.

2. The method as claimed in claim 1, wherein in the feature labeling step of the first procedure, the feature points are coordinates for corners of eyes and mouth on each training face image.

3. The method as claimed in claim 1, wherein the feature labeling step of the first procedure manually labels the feature points of each training face image.

4. The method as claimed in claim 1, wherein the reference shape ector is one of the shape vectors.

5. The method as claimed in claim 1, wherein the aligning step of the first procedure uses a 2D scaled rigid transform algorithm to align each shape vector with the reference shape vector.

6. The method as claimed in claim 5, wherein the aligning step of the first procedure further comprises the steps of:

selecting the reference shape vector as $x_i=(x_{i1},y_{i1},\ldots,x_{in},y_{in})$ and one of the shape vectors as $x_j=(x_{j1},y_{j1},\ldots,x_{jn},y_{jn})$;

computing a squared Euclidean distance E between the vectors $x_i$, and $x_j$ based on the following equation $E=(x_i-M^{(N)}(\alpha,\theta)[x_j]-t)^T(x_i-M^{(N)}(\alpha,\theta)[x_j]-t)$, where $M^{(N)}(\alpha,\theta)[x_j]-t$ is a geometric transform function defining with a plurality of transfer parameters to align the vector $x_j$, the transfer parameters include a rotating angle $\theta$, a scaling factor $\alpha$, and a shifting vector represented by $t=(t_x,t_y)$, and $M^{(N)}(\alpha,\theta)$ is a 2n×2n diagonal blocked matrix as well as $$M(\alpha,\theta)\begin{bmatrix}x_{jk}\\y_{jk}\end{bmatrix} = \begin{pmatrix}\alpha\cos\theta x_{jk} - \alpha\sin\theta y_{jk}\\ \alpha\sin\theta x_{jk} + \alpha\cos\theta y_{jk}\end{pmatrix}$$

for $1 \leq k \leq n$, as $$M(\alpha,\theta) = \begin{pmatrix}\alpha\cos\theta & -\alpha\sin\theta\\ \alpha\sin\theta & \alpha\cos\theta\end{pmatrix};$$

finding the smallest squared Euclidean distance and corresponding rotating angle $\theta_j$, scaling factor $\alpha_j$ and shifting vector represented by $t_j=(t_{xj},t_{yj})$ to align the shape vector $x_j$ so similar as the reference shape vector $x_i$;

computing a sum of smallest squared Euclidean distances after the N shape vectors are all aligned so similar as the reference shape vector, ending the aligning step when the sum is smaller than a predetermined threshold;

computing a mean value of the feature points in each block for the aligned shape vectors to define a mean shape vector for each aligned shape vector as $$\bar{x} = \frac{1}{N}\sum_{a=1}^{N} x_a,$$

wherein $x_a$ is the aligned shape vector; and assigning the mean shape vector as the reference shape vector and the aligned shape vectors as the shape vectors and then repeating the aligning step until all shape vectors are aligned.

7. The method as claimed in claim 6, wherein the transfer parameters is obtained by a least square algorithm.

8. The method as claimed in claim 1, wherein the statistical face shape model is a point distribution model (PDM).

9. The method as claimed in claim 1, wherein each shape vector $x_j$ consists of n feature vectors $s_j$ located in different blocks, so an average value as $$t = \frac{1}{N}\sum_{j=1}^{N} s_j$$

of the feature vectors $s_j$ corresponding to special blocks of all shape vectors $x_j$ is defined as a feature template.

10. The method as claimed in claim 1, wherein in the initial guessing step of the second procedure, scaling of initial guess shapes formed by the test feature points is aligned so similar as the test face image.

11. The method as claimed in claim 9, wherein the candidate feature point labeling step of the second procedure further comprises the steps of:

labeling a plurality of reference points derived from $$I_i \cong t + \sum_{j=1}^{k} b_j p_j$$

respectively in each search range, where t is the feature template of block corresponding to a search range, $p_j$ is j-th principal component of the statistical face shape model computed from the training feature vectors, and $b_j$ is an associated projection coefficient; using $$\varepsilon = \|I_i - t - \sum_{j=1}^{k} b_j p_j\|_2$$

to compute an error value between one of the reference points and the corresponding principal component $p_j$ and projection coefficient $b_j$; and selecting preceding k smallest error values and defining the k smallest error values as feature points of the search range.

12. The method as claimed in claim 11, wherein the test shape vector forming step of the second procedure does combination of the candidate feature points in different search ranges to thus form $k^n$ test shape vectors.

13. The method as claimed in claim 9, wherein the determining step of the second procedure further comprises the steps of:

using the average value of the aligned shape vectors and the principal components of the statistical face shape model to represent an approximate value of the test shape vector as $$x \cong \bar{x} + \sum_{j=1}^{k} b_j^x p_j^x,$$

where $\bar{x}$ is a mean shape vector defined according to the mean value of the feature points of the aligned shape vectors, $p_j^x$ is j-th principal component of the statistical face shape model, and $b_j^x$ is a corresponding projection coefficient;

using a 2D scaled rigid transform algorithm to align the test shape vector represented by $$x \cong M(\alpha, \theta)[\bar{x} + \sum_{j=1}^{k} b_j^x p_j^x] + t,$$

where $\theta$, $\alpha$ and t are a rotating angle, a scaling factor and a shifting vector respectively;

computing a normalized distance of the aligned test shape vectors by $$d(x) = \sqrt{\sum_{j=1}^{k} \left(\frac{b_j^x}{\lambda_j^x}\right)^2};$$

and assigning one candidate feature point corresponding to one, having the smallest normalized distance, of the aligned test shape vectors as facial feature of the test face image.

14. The method as claimed in claim 9, wherein the determining step of the second procedure further comprises the steps of:

using the average value of the aligned shape vectors and the principal components of the statistical face shape model to represent an approximate value of the test shape vector as $$x \cong \bar{x} + \sum_{j=1}^{k} b_j^x p_j^x,$$

where $\bar{x}$ is a mean shape vector defined according to the mean value of the feature points of the aligned shape vectors, $p_j^x$ is j-th principal component of the statistical face shape model, and $b_j^x$ is a corresponding projection coefficient;

using a 2D scaled rigid transform algorithm to align the test shape vector represented by $$x \cong M(\alpha, \theta)[\bar{x} + \sum_{j=1}^{k} b_j^x p_j^x] + t,$$

where $\theta$, $\alpha$ and t are a rotating angle, a scaling factor and a shifting vector respectively;

computing an error value between the test shape vector and the average value of the aligned test shape vectors by $$\varepsilon(x) = w_1 \sum_{i=1}^{n} \|I_i(x) - t_i - \sum_{j=1}^{k} b_j^i p_j^i\|_2 + w_2 d(x),$$

where $\sum_{i=1}^{n} \|I_i(x) - t_i - \sum_{j=1}^{k} b_j^i p_j^i\|_2$ is a similarity of the test shape vector to corresponding aligned shape vector $x_a$, and d(x) is the normalized distance of the aligned test shape vectors; and assigning one candidate feature point corresponding to one, having the smallest error value, of the test shape vectors as facial feature of the test face image.

15. The method as claimed in claim 14, wherein the error value is computed by an equation $$\varepsilon(x) = w_1 \left(\sum_{i=1}^{n} \sqrt{\sum_{j=1}^{k} \left(\frac{b_j^i}{\lambda_j^i}\right)^2}\right) + w_2 d(x).$$

* * * * *